United States Patent Office

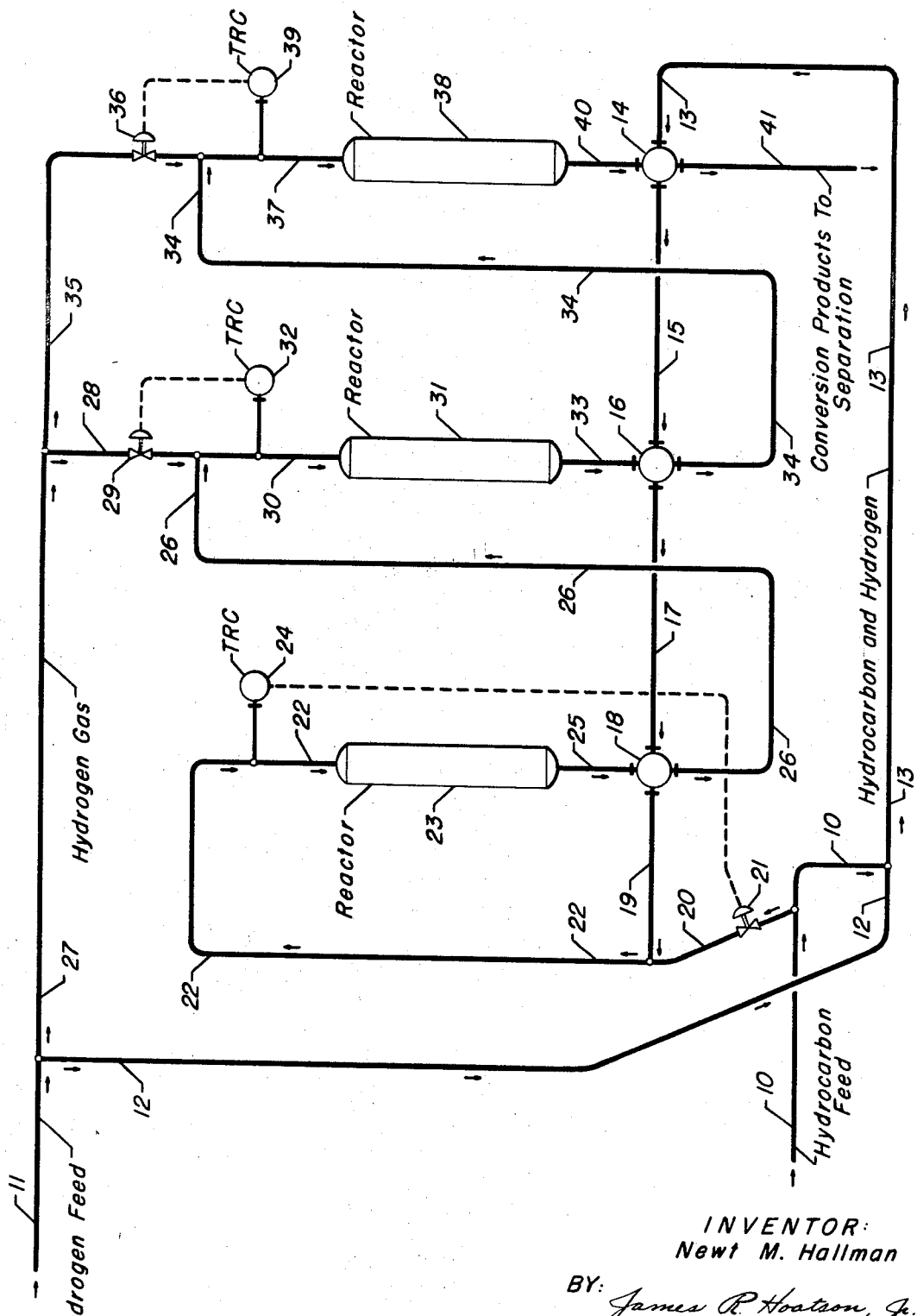

3,402,121
Patented Sept. 17, 1968

3,402,121
METHOD FOR CONTROLLING THE CONVERSION OF HYDROCARBONS
Newt M. Hallman, Mount Prospect, Ill., assignor to Universal Oil Products Company, Des Plaines, Ill., a corporation of Delaware
Filed Oct. 6, 1966, Ser. No. 584,787
4 Claims. (Cl. 208—59)

ABSTRACT OF THE DISCLOSURE

Method for starting-up and controlling a hydrocracking process unit by utilizing the feed mixture and/or hydrogen gas for temperature control of each reaction chamber in a serially connected plural stage conversion zone.

---

This invention relates to the conversion of hydrocarbons by catalytic exothermic reaction with a normally gaseous reactant. It particularly relates to a method for controlling the conversion of normally liquid hydrocarbons by such reaction in a serially connected plural stage conversion zone. It specifically relates to a method for controlling the hydrocracking of hydrocarbons into lower boiling hydrocarbons by fixed bed catalytic reaction. In other respects it relates to an improved method for starting-up and controlling a hydrocracking process unit.

It is well known in the art that hydrogenating reactions in general, and hydrocracking reactions specifically, are exothermic in nature; that is, the reaction releases significant quantities of heat which must be selectively disposed of if the reaction is to be controlled and optimum results are to be obtained. There have been a variety of schemes proposed for such a reaction and, in general, these embody quenching schemes wherein the heated effluent is quenched with a relatively cold stream so that the effluent temperature does not exceed a predetermined value. These quenching schemes inject the relatively cold stream either directly into the reactor or in physical admixture with the effluent in a conduit outside the reactor proper. Even though these schemes for controlling the effluent temperature from an exothermic reaction have been commercially successful, they are also inefficient in achieving economical thermal balance within the process unit.

With respect to the hydrogenation reaction, it is frequently carried out in a liquid or fluid diluent and in the presence of a catalyst. However, since this reaction is broadly exothermic in nature, if there is a system upset the temperature in the hydrogenating unit gets out of control usually necessitating the shutdown of the unit. Obviously, it is desirable that the hydrogenation reaction operate above a minimum predetermined temperature in order that the reaction will proceed according to the thermodynamics of the system. However, the predetermined reaction temperature level must also be chosen such that unwanted side reactions are prohibited. In other words, the economically optimum reaction temperature has both minimum and maximum limits thereby necessitating careful control of the reaction temperature. If such control is not achieved, there is a strong risk that "runaway" temperatures would result and/or unwanted side reactions would occur.

Hydrocracking, or destructive hydrogenation, as distinguished from simple hydrogenation as discussed hereinabove, effects definite changes in the molecular structure of hydrocarbons. It produces from a relatively heavy hydrocarbon feedstock relatively light or lower molecular weight hydrocarbon products. For example, the hydrocracking reaction can convert a petroleum feedstock, such as gas-oil, almost completely into gasoline boiling range products and lighter. It is of significant commercial interest since hydrocracking offers unique advantages over conventional catalytic cracking operation. Therefore, hydrocracking may be designated as a conversion process wherein not only are lower molecular weight or lower boiling conversion products produced, but these conversion products are substantially more saturated than when hydrogen or hydrogen-donor material is not present.

Although many of the prior art processes relating to the hydrocracking function may be and are conducted on a strictly thermal basis, the preferred processing technique involves the utilization of a catalytic mass possessing a high degree of hydrocracking activity. By the use of proper catalysis, the hydrocracking reaction can selectively convert a wide variety of feedstocks to lower boiling distillates with significantly less coke and gas yield than are usually produced by conventional catalytic cracking processes performed in the substantial absence of hydrogen or hydrogen-donor material.

It has been noted that much of the effort on the part of the prior art has been to develop processing schemes and manufacturing methods to increase the selectivity of the catalytic mass used for the hydrocracking reaction, or more generally, the hydrogenation reaction. Further, since these reactions are known to be strongly exothermic in nature, e.g. 200 to 400 B.t.u. per pound of feed hydrocarbon converted in a hydrocracking reaction, there has been a large effort on the part of the prior art to improve on the utility and capital cost and to improve the control and overall operating efficiency of conventional hydrogenation, including hydrocracking, processes. However, there is still a desire on the part of industry to further improve the process in these areas.

As mentioned previously, the nature of these reactions is strongly exothermic and, therefore, it is a necessity to maintain control over the reaction temperature in order to not only optimize the production of the desired conversion products, but also to prevent the reaction temperature from being classified as "runaway" or out of control. In recognition of the problem the prior art has disclosed means for controlling the reaction temperature which generally comprise continuously detecting the temperature of the reactor effluent and then regulating the flow of recycle liquid to the reactor and/or the flow of gas quench to the reactor effluent responsive to changes in the detected temperature through a predetermined temperature range. However, operating in this manner results in significant time delay for control to be exercised over the reactor effluent temperature since it takes considerable time for the effect of increasing, for example, the recycle liquid to work its way through the reactor system and be responsive with a change in the reactor effluent temperature. Therefore, some means of achieving better control with faster response to temperature upsets is desirable.

Accordingly, it is an object of this invention to provide a method for the conversion of hydrocarbons by catalytic exothermic reaction with a normally gaseous reactant in a serially connected plural stage conversion zone. It is another object of this invention to provide an improved method for controlling the conversion of normally liquid hydrocarbons by such reaction. It is still another object of this invention to provide an improved method for controlling the hydrocracking of relatively heavy hydrocarbons into relatively light hydrocarbons.

Still other objects, features and advantages of this invention will be obvious to those skilled in the art from a discussion of the details of the invention hereinbelow with reference to the appended drawing which is a schematic flow diagram representing one embodiment of the invention.

According to this invention, a method for controlling the conversion of normally liquid hydrocarbons by catalytic exothermic reaction with a normally gaseous reactant in a serially connected plural stage conversion zone comprises controlling the first stage feed inlet termperature by admixing with heated hydrocarbons a portion of said hydrocarbons in unheated conditions, the amount of unheated hydrocarbon added being in response to the said inlet temperature measurement; controlling each succeeding stage inlet temperature by admixing with each respective preceding stage cooled effluent a portion of said gaseous reactant in unheated condition, the amount of unheated gaseous reactant added being in response to each said inlet temperature measurement respectively; and supplying heat to said hydrocarbons and cooling said effluent by indirect heat exchange therebetween.

According to one specific embodiment of this invention, a method for controlling the conversion of hydrocarbons by catalytic exothermic reaction with hydrogen in a serially connected plural stage conversion zone containing conversion catalyst comprises the steps of passing a major portion of the hydrocarbons to be converted in admixture with hydrogen into indirect heat exchange with the conversion zone effluent as hereinafter specified thereby heating said hydrocarbons and hydrogen; passing a minor portion of the hydrocarbons to be converted in unheated condition into admixture with said heated hydrocarbons and hydrogen thereby forming a first reaction feed mixture; partially converting the hydrocarbons by passing said first feed mixture into the first stage of said zone under conversion conditions including conversion temperature; measuring the first stage inlet temperature of said first feed mixture; controlling in response to said first stage inlet temperature measurement the rate of passing said heated hydrocarbons and hydrogen such that substantially first conversion temperature is maintained; passing the effluent from the first stage of said conversion zone at a temperature substantially above said inlet temperature into indirect heat exchange with said major portion of hydrocarbons, as specified, thereby quenching said effluent; passing hydrogen gas in unheated condition into admixture with said quenched effluent to form a second feed mixture; at least partially converting the hydrocarbons to be converted by passing said second feed mixture into a second stage of said zone under conversion conditions including conversion temperature; measuring the inlet temperature of the second feed mixture to the second stage of said zone; and, controlling in response to said second stage inlet temperature measurement the rate of passing said unheated hydrogen gas into said quenched effluent such that substantially second stage conversion temperature is maintained.

As has been indicated, this invention is applicable broadly to hydrogenation, including destructive hydrogenation or hydrocracking. However, it is important to note from the description presented hereinabove, that the practice of this invention requires that such reaction be carried out in a serially connected plural stage conversion zone. The reason for this requirement, of course, is that the problems such as described herein are not present with the moving bed or fluidized bed type of operation, or in the single stage fixed bed type of operation.

As used herein, the term "hydrogenation" is intended to cover broadly the addition of hydrogen to unsaturated bonds between carbons atoms. Therefore, the process of this invention, as specifically limited herein, is suitable for any process involving the contacting, for example, of hydrogen and liquid hydrocarbons. Thus, lubricating oils can be decolorized and/or desulfurized; unsaturated aliphatic or aromatic constituents in gasoline may be saturated; linseed oil can be converted to a solid; the hydrocarbons $C_{17}H_{32}$ and $C_{17}H_{30}$ can be converted to heptadecane; the ethyl ester of linoleic acid can be converted into the ethyl ester of stearic acid; paraffin wax with a 40° C. solidifying point can be converted into a paraffin wax having a 43° C. solidifying point; benzene can be hydrogenated to cyclohexane; and so forth.

The particular operating conditions for the hydrogenating reaction, exemplified from the above recitation, are well known to those skilled in the art. For example, the desulfurizing of lubricating oils, e.g., those oils boiling between 400° F. and 800° F., is performed at temperatures ranging from 500° F. to 1,000° F., and pressures from 150 p.s.i.g. to 10,000 p.s.i.g. On the other hand, the hardening of vegetable and marine oils is performed at temperatures from 100° F. to 400° F., and at slightly elevated pressures, e.g., 50 to 150 p.s.i.g. Liquid hourly space velocities (LHSV) may be varied from 0.1 to 20. Those skilled in the art know how to choose the proper operating conditions according to the characteristics of the particular system in question.

With respect to the hydrocracking reaction, this reaction involves the converting of relatively heavy hydrocarbons into lower boiling hydrocarbons. The relatively low boiling products can be separated into desired fractions, such as a gasoline fraction containing hydrocarbons having four carbon atoms, up to those boiling at 400° F. ($C_4$–400° F.), a middle oil containing hydrocarbons boiling from 400° F. to 650° F., a heavy hydrocarbon boiling from 650° F. to 840° F., and recycle oil consisting of hydrocarbons boiling above 840° F. Other fractions can be separated as desired.

A wide variety of hydrocarbons having initial boiling points above 840° F. can be converted according to the process of this invention, including residues from petroleum cracking operations, reduced heavy crude oil, steel tars, and the like. If it is desired to utilize extremely heavy hydrocarbons as feedstock to this invention, excellent results will be obtained as the feedstock has a hydrogen to hydrocarbon ratio of a least 1.2, and preferably above about 1.4. Excellent results are also obtained when the API gravity is below 25. Generally, the Ramsbottom carbon residue of such a feedstock will be from about 9 to 30, but in some cases may be as low as about 4. Other suitable hydrocarbon charge stocks for the practice of this invention via the hydrocracking reaction include kerosene fractions, gas-oil fractions, lubricating oil and white oil stocks, fuel oil stocks, reduced crudes, and other sources of hydrocarbons having a depreciated market value due to the relatively high boiling points of these stocks accompanied by the usual presence of asphaltic and other heavy residues.

As more particularly described in the illustrative example hereinbelow, the present invention is particularly adaptable to those hydrocarbons having an initial boiling point in excess of about 650° F., preferably having an ASTM boiling range from 650° F. to about 1100° F. Generally, all of the sources of hydrocarbon feedstocks useful for the hydrocracking reaction contain nitrogenous compounds and it is distinctly preferable in the practice of this invention to limit the nitrogen content of the hydrocarbon feedstock to less than 1500 p.p.m. total nitrogen.

In the hydrocracking process, the hydrocarbons to be converted into lower boiling hydrocarbons are contacted with a catalyst for from, say, about 15 minutes to 8 hours at a temperature of from 650° F. to 900° F. and under an imposed pressure within the range of from 300 to 3000 p.s.i.g. However, it is distinctly preferable for the pressure to be at least 1500 p.s.i.g. and still more preferable for the pressure to be within the range of 2000 to 2500 p.s.i.g. At pressures below about 1500 p.s.i.g., the recycle oil obtained from the hydrocracking reaction is dehydrogenated as evidenced by an increased Ramsbottom carbon residue, as compared to the charge oil, whereas at pressures above about 1500 p.s.i.g., the recycle oil from the hydrocracking operation has a reduced Ramsbottom carbon and therefore can be recycled to extinction. Hydrogen must be present and preferably a substantial excess is used, such as a mol ratio of hydrogen to oil of from 2 to 20. Generally, the process conditions are adjusted to provide about 20% to 60% by volume conversion of the feedstock hydrocarbons to lower boiling hydrocarbons per pass. To effectuate this conversion, the chemical hydrogen consumption will range from about 500 to 5000 standard cubic feet per barrel (s.c.f.b.) of feed hydrocarbons.

After contacting the oil in the catalyst through the plurality of conversion stages under the conditions as stated above, the effluent is generally separated into desired fractions by distillation. A gasoline fraction can be separated and used as motor fuel, as a component of motor fuel by blending with hydrocarbons from other sources, or used in subsequent refinery operations such as reforming. Distillate oil products can be used without further treatment, such as fuel oil, or can be used in subsequent refinery operations, for example, thermal or catalytic cracking. Any recycle oil separated can be returned to the process as mentioned previously.

The catalyst used in the practice of the present invention may be generally any catalyst known to those skilled in the art for effectuating the conversion reaction whether broadly hydrogenation or, specifically, hydrocracking. For the hydrocracking reaction the catalyst used may be any known to be selective for the hydrocracking reaction in the presence of nitrogenous compounds, such as ammonia. Thus, in regard to nitrogen-insensitive hydrocracking catalyst, the term "metallic component" or "catalytically active metallic component" is intended to encompass those catalytic components which are employed for their hydrocracking activity or for their propensity for the destructive removal of the nitrogenous compounds, as the case may be. These catalytically active metallic components are selected from the metals and compounds of Groups VI–A and VIII of the Periodic Table. In this manner, the metallic catalytic components are distinguished from those components that are employed as the solid support, or carrier material, or the acidic cracking component. The metallic component of the catalyst which may be employed in the practice of this invention may comprise two or more of such metals. Thus, the catalyst employed in the present method may comprise chromium, molybdenum, tungsten, iron, cobalt, nickel, palladium, platinum, ruthenium, rhodium, osmium, iridium, and mixtures of two or more including nickel-molybdenum, nickel-chromium, molybdenum-platinum, cobalt-nickel-molybdenum, molybdenum-palladium, chromium-platinum, chromium-palladium, molybdenum-nickel-palladium, etc.

Regardless of the particular catalytically active component or components, these are composited with a suitable solid carrier material which may be either naturally occurring or which may be synthetically prepared by means known to those in the art. Naturally occurring carrier materials include various aluminum silicates, particularly when acid-treated to increase the activity thereof, various alumina-containing clays, sands, earths and the like. Typically, the synthetically prepared components include at least a portion of both silica and aluminum. Other suitable carrier material components which may, in particular instances, be combined as an integral portion of the hydrocracking catalyst include zirconia, magnesia, thoria, boria, titania, strontia, hafnia, etc., with the preferred cracking component consisting essentially of the composite of silica and alumina.

As hereinafter set forth in greater detail with respect to the embodiment of the present invention illustrated by the appended drawing, the method of the present invention requires that the catalyst be deposed in two or more separate but integral reaction stages serially connected and representing a plural stage reaction zone. In such zone, each stage may contain a distinct catalytic composite of the same composition, or of a different composition, or any combination and mixtures of catalyst depending upon the needs of the business situation experienced by those skilled in the art.

For the hydrogenation reaction, generally, as distinguished from destructive hydrogenation or hydrocracking, any catalyst known to those skilled in the art may also be used. A typical hydrogenation catalyst is a conventional cobalt-molybdenum on a silica-alumina base. However, in no event is the scope of this invention to be limited by a particular catalyst composition useful broadly under the hydrogenation reaction.

This invention will be further described with reference to the attached drawing which is a schematic flow diagram of a typical hydrocracking process utilizing the control feature of this invention.

Referring now to the drawing, the hydrocarbon charge stock enters the process from line 10 and is pumped into line 13 wherein it is admixed with hydrogen which is introduced via line 12. For purposes of this example, the hydrocarbon feedstock may have an ASTM boiling range from 650° F. to 1100° F.

The mixture of hydrogen and hydrocarbon in line 13 is passed into exchanger 14 such that the temperature of the mixture is increased, for example, from 140° F. to 380° F. Typically, the hydrogen is present in an amount within the range of from 500 to 30,000 standard cubic feet per barrel of charge, e.g., 20,000 s.c.f./b. The preheated mixture is then raised to about 830° F. by passing through exchangers 16 and 18 via lines 15, 17 and 19 thereby picking up heat by indirect heat exchange with reactor effluent, as more fully explained hereinbelow.

As indicated previously, this invention has unique advantages in the start-up of a conversion process such as a hydrocracking process. Since the hydrocracking reaction is strongly exothermic, the temperature of the effluents leaving each reactor is substantially above the respective reactor inlet temperatures. Therefore, as the feed exchanges heat with the effluent, the temperature of the feed varies considerably as the temperature of the effluent varies. Therefore, it seems clear that some degree of control must be exercised over both the inlet temperature to the initial reactor since it is determined by the degree of heat exchanged with the effluent, as well as the inlets to each succeeding reactor since these are responsive to not only the particular reactor effluent, but also to the degree of heat exchanged with the feed.

Accordingly, in the event that the temperature of the mixture in line 19 exceeds a predetermined value for the inlet temperature to the first stage reactor, unheated feed hydrocarbons are admixed with the heated hydrocarbons by admitting such relatively cold material via line 20, thereby forming a first feed mixture in line 22 at the desired reactor inlet temperature.

The first stage reactor inlet temperature in line 22 is measured by temperature recorder controller (TRC) 24 in a continuous manner. As the inlet temperature in line 22 varies either above or below the predetermined set point for inlet temperature, TRC 24 activates control valve 21 to either increase or decrease the flow of unheated hydrocarbons into line 19 in response to the temperature measurement. The amount of material in unheated condition which is admixed with the heated hydrogen and hydrocarbon of necessity can vary over a wide range. For start-up of the process the amount added from line 20 into line 19 will probably vary the greatest. However, during operation, TRC 24, by activating valve 21, permits positive selective control over the inlet temperature of the first feed mixture into the first stage reactor.

Alternatively, there can be additional heat input to the system by passing the material in either line 19 or line 22 through a direct-fired heater, not shown, should the amount of heat exchange practically obtainable not be sufficient to achieve conversion temperature. Of course, modifications to the heat exchange system may be practiced by those skilled in the art. In this example, the entire hydrocarbon stream passes in series flow through the exchanger train. Advantageously, split flow or parallel flow through this exchanger train may also be used, or any combination of parallel flow and series flow may be used with satisfactory results.

Referring now to the mixture of hydrocarbons and hydrogen in line 22, at the measuring point for TRC 24, this first feed mixture at the desired predetermined reactor inlet temperature of, say, 830° F., is now passed into hydrocracking reactor 23 having deposed therein suitable hydrocracking catalyst as referred to hereinabove, in a fixed bed relationship. The precise operating conditions in reactor 23 will be dependent upon the various physical and/or chemical characteristics of the particular hydrocarbons being processed, and will be dependent upon the type of catalyst contained within reactor 23. As indicated before, reactor 23 will be maintained at a conversion temperature of, say, 650° F. to 900° F., preferably about 830° F., and under an imposed pressure within the range of from 300 to 3000 p.s.i.g., preferably, at an imposed pressure of about 2200 p.s.i.g. The total hydrocarbons in the feedstock in reactor 23 will contact the particular catalyst at a liquid hourly space velocity (LHSV) within the range of about 0.5 to about 10, preferably, for illustrative purposes, of about 0.75.

The catalyst deposed within the catalyst bed serves a dual function; that is, the catalyst is non-sensitive to the presence of nitrogenous compounds while at the same time it is capable of effecting the destructive removal therefrom, and also is capable of effecting conversion of at least a portion of those hydrocarbons boiling, for example, at a temperature in excess of about 650° F. to 700° F.

Since the hydrocracking reaction is exothermic in nature, the reaction effluent from reactor 23 is withdrawn at a temperature of at least conversion temperature and/or at least reactor inlet temperature as measured by TRC 24, and typically is substantially above the reactor inlet temperature, e.g., 880° F., through line 25 and passed into exchanger 18 wherein the reactor 23 effluent is quenched by indirect heat exchange with the feed hydrocarbons as hereinabove discussed. The quenched effluent stream is now passed via line 26 into line 30 wherein it is admixed with additional hydrogen gas in unheated condition from line 28 as more fully described hereinbelow.

With reference to the discussion surrounding the control of the reactor inlet temperature to reactor 23 by adding to the heated hydrocarbons and hydrogen unheated feed hydrocarbons, it is apparent that for effective control to be exercised by the interaction of the TRC 24 activating control valve 31, the heat exchange characteristics encountered in heat exchange trains 14, 16 and 18 require that the material in line 19 be at a temperature significantly above the desired temperature in line 22, e.g., 875° F. If the temperature in line 19 is not significantly higher than the desired temperature, it will be difficult to use quench as a control mechanism. Accordingly, for control purposes, the quenched effluent in line 26 is also at a temperature substantially above the desired inlet temperature to reactor 31, e.g., 850° F., versus desired 830° F.

Accordingly, the temperature of the second feed mixture comprising quenched effluent from line 26 and unheated hydrogen gas in line 28, is continuously measured by TRC 32. For the situation wherein such temperature measurement exceeds the predetermined set temperature point of, say, 830° F., a signal proportional to the temperature of the material in line 30 is transmitted to TRC 32 which in turn transmits a signal to valve 28 to adjust accordingly the amount of unheated hydrogen gas passed into line 30 from line 28.

Therefore, it can be seen for the first two stages of this operation that this invention involves the interrelated and interdependent temperature control system embodied in TRC 24 and TRC 32. Furthermore, it is also noted at this point that the control of the process involves the measurement and control of the reactor inlet temperatures rather than the measurement and control of the reactor effluents as taught by the prior art.

The second feed mixture in line 30, at a reactor inlet temperature of, say, 830° F., is now passed into reactor 31 under conditions wherein at least part of the hydrocarbons to be converted are converted into lower boiling hydrocarbons. As discussed with respect to reactor 23, the effluent from reactor 31 is withdrawn via line 33 and, typically, is substantially above the reactor inlet temperature, e.g., 880° F. The reactor 31 effluent at its elevated temperature is passed via line 33 into exchanger 16 where, by indirect heat exchange, the feed hydrocarbons and hydrogen in line 15 are heated an additional 100° F. to 200° F. and wherein the effluent withdrawn from exchanger 16 via line 34 is quenched to a temperature substantially below that temperature in line 33, but also substantially above the predetermined desired reactor inlet temperature as measured by TRC 39 more fully discussed hereinafter. The quenched reactor 31 effluent is passed via line 34 and into reactor 38 via line 37.

Again, as indicated hereinabove, for control purposes, the temperature of the material at the inlet to reactor 38 is measured by TRC 39. If the temperature measured is above the predetermined set reactor inlet temperature of, say, 830° F., a signal is transmitted from TRC 39 to control valve 36 wherein hydrogen gas in unheated condition is passed via line 35 into line 37 thereby forming a third feed mixture having a temperature as predetermined. The third feed mixture is then passed into hydrocracking reactor 38 under conditions to at least partially convert the remaining hydrocarbons to be converted into lower boiling hydrocarbons. The effluent from reactor 38 is removed at a temperature of, say, 880° F., via line 40 into exchanger 14 wherein the feed hydrocarbons and hydrogen are heated, for example, from a temperature of 140° F. to a temperature of 380° F. as previously indicated, and the reactor 38 effluent in line 40 is cooled from the 880° F. to a temperature of approximately 830° F. in line 41. The quenched and cooled conversion zone effluent is removed from the system via line 41 and is passed into a separation zone, not shown, for recovery of lower boiling hydrocarbons.

Generally, as the feed hydrocarbons and hydrogen are passed in series through a three stage exchanger train, as shown in the attached drawing, approximately 200° F. to 300° F., average, can be added to the feed per exchanger stage with maximum heating in the first stages of exchange and minimum heat in the latter stages of exchange. Those skilled in the art will know how to change the heat exchange characteristics to optimize the thermal balance of the system, taking advantage of the inventive control system described herein. In each of the heat exchange systems illustrated, those skilled in the art will recognize that the thermal balance attained requires an excess of temperature in the stream to be controlled in order for the inventive control system to operate economically; that is, the temperature of the material in lines 19, 26 and 34 must be significantly above the predetermined inlet temperatures to each reactor stage of the conversion zone. This means that the apparatus and operating conditions must be designed so that control valves 21, 29 and 36 will operate, for example, on a signal of about 2 to 3 p.s.i.g. air pressure for a valve having a 0 to 15 p.s.i.g. air pressure control range. It is within the scope of this invention for other control valves to be utilized.

Example

The practice of the present invention is further illustrated by the following example which indicates the products that may be obtained from the processing of a vacuum gas-oil stream according to the scheme shown in the appended drawing and using typical conditions cited hereinabove. The feedstock hydrocarbons had an API gravity of 23.1, a sulfur content of about 1.5 wt. percent, a nitrogen content of about 1200 p.p.m. by weight, and an ASTM boiling range of from 660° F. to 1100° F. The hydrogen purity was 97.5 mol. percent. The following products were obtained on the basis of charging 26,000 barrels per stream day of the feedstock:

|  | °API | BPSD |
|---|---|---|
| $C_5$–$C_6$ | 80.2 | 2,265 |
| Naphtha | 57.2 | 3,646 |
| Diesel Fuel | 40.0 | 22,374 |

The invention claimed:

1. Method for controlling the conversion of hydrocarbons by catalytic exothermic reaction with hydrogen in a serially connected plural stage conversion zone containing conversion catalyst which comprises the steps of
   (a) passing a major portion of the hydrocarbons to be converted in admixture with hydrogen into indirect heat exchange with the conversion zone effluent as hereinafter specified thereby heating said hydrocarbons and hydrogen;
   (b) passing a minor portion of the hydrocarbons to be converted in unheated condition into admixture with said heated hydrocarbons and hydrogen thereby forming a first reaction feed mixture:
   (c) partially converting the hydrocarbons by passing said first feed mixture into the first stage of said zone under conversion conditions including conversion temperature;
   (d) measuring the first stage inlet temperature of said first feed mixture;
   (e) passing said unheated portion of hydrocarbons into admixture with said heated hydrocarbons and hydrogen at a rate responsive to said first stage inlet temperature measurement such that substantially first stage conversion temperature is maintained;
   (f) passing the effluent from the first stage of said conversion zone at a temperature substantially above said inlet temperature into indirect heat exchange with said major portion of hydrocarbons as specified thereby quenching said effluent;
   (g) passing hydrogen gas in unheated condition into admixture with said quenched effluent to form a second feed mixture;
   (h) at least partially converting the hydrocarbons to be converted by passing said second feed mixture into a second stage of said zone under conversion conditions including conversion temperature;
   (i) measuring the inlet temperature of the second feed mixture to the second stage of said zone; and,
   (j) passing said unheated hydrogen gas into said qunched effluent at a rate responsive to said second stage inlet temperature such that substantially second stage conversion temperature is maintained.

2. Method for converting hydrocarbons into lower boiling hydrocarbons by catalytic exothermic hydrocracking reaction in a serially connected plural stage hydrocracking zone which comprises
   (a) passing a portion of the hydrocarbons to be converted in admixture with hydrogen into indirect heat exchange with the conversion zone effluent as hereinafter specified thereby heating said hydrocarbons and hydrogen;
   (b) passing another portion of the hydrocarbons to be converted in unheated condition into admixture with said heated hydrocarbons and hydrogen thereby forming a first reaction feed mixture;
   (c) contacting said first feed mixture with catalyst in a first stage of said zone under conditions including reaction temperature sufficient to convert at least part of the hydrocarbons to be converted into lower boiling hydrocarbons;
   (d) measuring the first stage inlet temperature of said first feed mixture and analyzing such measurement with respect to said first reaction temperature;
   (e) passing said unheated hydrocarbons into admixture with said heated hydrocarbons at a rate responsive to said analysis of the first stage inlet temperature such that said first stage reaction temperature is maintained;
   (f) withdrawing from the first stage of said zone the reactor effluent at a temperature substantially in excess of said first stage reaction temperature;
   (g) quenching said first stage effluent by indirect heat exchange with the hydrocarbons to be converted as specified;
   (h) passing hydrogen in unheated condition into admixture with said quenched effluent to form a second feed mixture;
   (i) contacting said second feed mixture with catalyst in a second stage of said zone under conditions including reaction temperature sufficient to convert hydrocarbons to be converted into lower boiling hydrocarbons;
   (j) measuring the second stage inlet temperature of said second feed mixture and analyzing such measurement with respect to said second reaction temperature;
   (k) passing said unheated hydrogen into admixture with said cooled effluent at a rate responsive to said analysis of the second stage inlet temperature such that said second stage reaction temperature is maintained;
   (l) withdrawing from the second stage of said zone the reactor effluent at a temperature substantially in excess of said second stage reaction temperature;
   (m) quenching said second stage effluent by indirect heat exchange with the hydrocarbons to be converted as specified; and
   (n) recovering lower boiling hydrocarbons from the conversion zone effluent.

3. Method according to claim 2 wherein said hydrocarbons to be converted boil within the range of 650° F. to 1100° F. and said conditions for conversion include a temperature from 700° F. to 900° F., pressure from 500 to 5000 p.s.i.g., liquid hourly space velocity from 0.5 to 10, and hydrogen to hydrocarbon volume ratio of from 500 to 30,000 s.c.f./b.

4. Method for controlling the conversion of normally liquid hydrocarbons by catalytic exothermic reaction with a normally gaseous reactant in a serially connected plural stage conversion zone which comprises
   (a) controlling the first stage feed inlet temperature by admixing with heated hydrocarbons a portion of said hydrocarbons in unheated condition, the amount of unheated hydrocarbon added being in response to the said inlet temperature measurement;
   (b) controlling each succeeding stage inlet temperature by admixing with each respective preceding stage cooled effluent a portion of said gaseous reactant in unheated condition, the amount of unheated gaseous reactant added being in response to each said inlet temperature measurement, respectively; and,
   (c) supplying heat to said hydrocarbons and cooling said effluent by indirect heat exchange therebetween.

References Cited

UNITED STATES PATENTS

| 2,903,417 | 9/1959 | Beaugh et al. | 208—136 |
| 3,192,281 | 6/1965 | Corneil | 260—672 |

DELBERT E. GANTZ, *Primary Examiner.*

A. RIMENS, *Assistant Examiner.*